(12) United States Patent
Thomas

(10) Patent No.: US 11,553,062 B2
(45) Date of Patent: Jan. 10, 2023

(54) TRANSFER OF DATA WITH DIFFERENT PRIORITIES VIA BLUETOOTH LOW ENERGY

(71) Applicant: Audi AG, Ingolstadt (DE)

(72) Inventor: Martin Thomas, Altmannstein (DE)

(73) Assignee: AUDI AG, Ingolstadt (DE)

( * ) Notice: Subject to any disclaimer, the term of this patent is extended or adjusted under 35 U.S.C. 154(b) by 0 days.

(21) Appl. No.: 17/052,387

(22) PCT Filed: Mar. 4, 2019

(86) PCT No.: PCT/EP2019/055257
§ 371 (c)(1),
(2) Date: Nov. 2, 2020

(87) PCT Pub. No.: WO2019/211024
PCT Pub. Date: Nov. 7, 2019

(65) Prior Publication Data
US 2021/0243274 A1    Aug. 5, 2021

(30) Foreign Application Priority Data

May 3, 2018 (DE) .................. 10 2018 206 785.6

(51) Int. Cl.
*H04L 67/61* (2022.01)
*H04W 4/80* (2018.01)
(Continued)

(52) U.S. Cl.
CPC .............. *H04L 67/61* (2022.05); *H04W 4/80* (2018.02); *H04W 28/10* (2013.01); *H04W 72/10* (2013.01); *H04W 84/20* (2013.01)

(58) Field of Classification Search
CPC ........ H04L 67/32; H04W 4/80; H04W 28/10; H04W 72/10; H04W 72/12; H04W 84/18; H04W 84/20
See application file for complete search history.

(56) References Cited

U.S. PATENT DOCUMENTS 9,497,612 B2 * 11/2016 Linde .................... H04W 8/005
10,186,762 B2    1/2019 Papp et al.
(Continued)

FOREIGN PATENT DOCUMENTS

DE    102014200226 A1    7/2015
DE    102016013517 A1    5/2017
(Continued)

OTHER PUBLICATIONS

International Search Report and Written Opinion of the International Searching Authority directed to related International Patent Application No. PCT/EP2019/055257, dated Apr. 24, 2019, with attached English-language translation; 16 pages.
(Continued)

*Primary Examiner* — Jenee Holland
(74) *Attorney, Agent, or Firm* — Sterne, Kessler, Goldstein & Fox P.L.L.C.

(57) ABSTRACT

The present disclosure relates to a method for transferring data, in which a peripheral device and a central device are wirelessly connected in accordance with the Bluetooth Low Energy (BLE) standard and a data packet is transferred within a transfer window of a Bluetooth Low Energy data channel between the peripheral device and the central device.

20 Claims, 1 Drawing Sheet

Figure 1A:
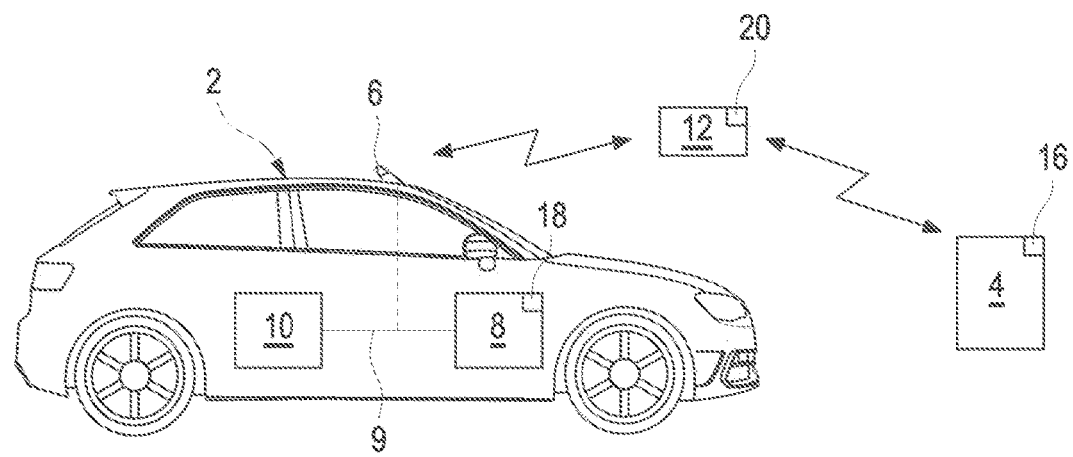

(51) Int. Cl.
*H04W 28/10* (2009.01)
*H04W 72/10* (2009.01)
*H04W 84/20* (2009.01)
*H04W 84/18* (2009.01)
*H04L 67/12* (2022.01)
*H04W 4/40* (2018.01)

(56) References Cited

U.S. PATENT DOCUMENTS

| | | | |
|---|---|---|---|
| 10,708,359 B2 | 7/2020 | Lim et al. | |
| 2016/0014550 A1* | 1/2016 | Chiddarwar | H04W 4/80 455/41.2 |
| 2016/0366263 A1* | 12/2016 | Song | H04R 25/554 |
| 2017/0006415 A1* | 1/2017 | Song | H04W 4/80 |
| 2017/0034647 A1* | 2/2017 | Takeuchi | H04W 76/15 |
| 2017/0127445 A1* | 5/2017 | Lee | H04W 4/70 |
| 2017/0251469 A1* | 8/2017 | Lee | H04L 5/0055 |
| 2017/0289789 A1* | 10/2017 | Jepson | H04W 76/10 |
| 2018/0007706 A1 | 1/2018 | Sakwa | |
| 2018/0152891 A1* | 5/2018 | Xie | H04W 52/0235 |
| 2018/0332661 A1* | 11/2018 | Andon | G01S 5/14 |
| 2019/0020741 A1* | 1/2019 | Knaappila | H04W 4/80 |
| 2019/0028958 A1* | 1/2019 | Broerman | H04W 4/80 |
| 2019/0103914 A1* | 4/2019 | Junk | H04W 12/10 |
| 2019/0327675 A1* | 10/2019 | Takeuchi | H04W 76/40 |
| 2020/0177311 A1* | 6/2020 | Ho | H03M 13/373 |
| 2020/0230499 A1* | 7/2020 | Buser | A63F 13/352 |
| 2020/0275303 A1* | 8/2020 | Mok | H04W 28/0268 |
| 2020/0275525 A1* | 8/2020 | Eriksson | H04W 76/14 |
| 2020/0304604 A1* | 9/2020 | Zhao | H04L 69/16 |
| 2022/0007201 A1* | 1/2022 | Högberg | H04R 25/552 |

FOREIGN PATENT DOCUMENTS

| | | |
|---|---|---|
| DE | 102015016334 A1 | 6/2017 |
| WO | WO 2003/063428 A1 | 7/2003 |

OTHER PUBLICATIONS

"Bluetooth Core System Package [Low Energy Controller Volume]" Covered Core Package Version 5.0, vol. 6, Bluetooth SIG Proprietary, Dec. 6, 2016; 263 pages.

Lin, Jiun-Ren et al., "On the Potential of Bluetooth Low Energy Technology for Vehicular Applications," IEEE Comm. Mag., Jan. 2015, pp. 267-275.

Wikipedia, Die freie Enzyklopädie: "Buetooth," with attached English translation, archive date Apr. 24, 2018, available at: https://de.wikipedia.org/w/index.php?title=Bluetooth&oldid=176835746, 33 pages.

International Preliminary Report on Patentability directed to related International Patent Application No. PCT/EP2019/055257, completed Aug. 27, 2020, with attached English-language translation; 14 pages.

* cited by examiner

TRANSFER OF DATA WITH DIFFERENT PRIORITIES VIA BLUETOOTH LOW ENERGY

TECHNICAL FIELD

The present disclosure relates to a method for transferring data, in which a peripheral device and a central device are wirelessly connected in accordance with the Bluetooth Low Energy (BLE) standard and a data packet is transferred within a transfer window of a Bluetooth Low Energy data channel between the peripheral device and the central device.

BACKGROUND

A modern vehicle usually comprises a bus system and a plurality of functional systems, such as safety systems and comfort systems, which are connected to the bus system. For controlling the functional systems, the vehicle further comprises at least one control device, which has applications corresponding to the functional systems and is also connected to the bus system.

In addition, modern vehicles can comprise communication devices connected to the bus system for wirelessly transferring data, i.e., for transferring data by means of electromagnetic waves. Such a communication device can have a cellular interface, for example, in order to enable an occupant of the vehicle to make convenient mobile phone calls in the passenger compartment of the vehicle. In addition, the communication device can also be used to transfer data to the vehicle. If said data are control data for direct forwarding to functional systems of the vehicle, the data transfer is associated with a high safety risk for the vehicle.

In order to reduce said risk, DE 10 2015 016 334 A1 discloses a roof antenna module and a method for wirelessly transferring external control data to a functional system of a vehicle connected to a bus system of the vehicle. The roof antenna module is connected to the bus system of the vehicle and has a communication control unit with a filter module, which is configured to verify the transferred external control data and to only transfer them to the functional system if the external control data meet a predetermined safety criterion.

If the cellular interface is also used to download updates from a server for applications installed in control units, to transfer operating parameters of the vehicle to a stationary receiver, to exchange other data with further vehicles, or the like, the problem of distributing to the different applications of the vehicle a transfer bandwidth currently provided by a cellular connection arises.

For this purpose, DE 10 2014 200 226 A1 discloses a device and a method for controlling a wireless transfer of data between a central communication device of a vehicle and an external communication unit, such as a base station of a cellular network or a wireless local area network (WLAN) access point. An organization module is provided in the communication device, which, as required, assigns the wireless connection capacities provided by a plurality of connection modules of the communication unit to a plurality of applications of the vehicle. For this purpose, specific parameters, such as the current bandwidth of a wireless connection, a current error rate, a current latency period, and transfer costs can be taken into account.

In addition to a cellular interface, a communication device of a vehicle can have other interfaces for wireless connections, for example, a WLAN interface for transferring data to a stationary access point. If a plurality of wireless connections is available, the data volume to be transferred can be distributed to the respectively assigned interfaces of the communication device.

DE 10 2016 013 517 A1 addresses a similar distribution problem. It discloses a method for wirelessly transferring data between a plurality of terminals and a plurality of stationary access points which are part of a local area network (LAN) and support several different radio standards (radio access technology, RAT). The stationary access points can comprise WLAN access points and base stations of a cellular network. In the method, the stationary access points communicate in order to adapt a parameter of the wireless transfer such that the data to be transferred wirelessly are assigned to the access points in accordance with the available transfer capacities of the respective radio standard.

Apart from a cellular interface and a WLAN interface, a communication device of a vehicle can furthermore comprise a Bluetooth interface. The Bluetooth standard, particularly the Bluetooth Low Energy standard, defines a short-range wireless connection between a central device and a peripheral device, which are arranged at a relatively short distance from one another. Common mobile terminals, such as smartphones, usually also comprise a Bluetooth interface, which is why the Bluetooth standard is basically taken into consideration in order to remotely control the vehicle on sight with a mobile terminal, for example, when parking in and pulling out of a parking space remotely.

BRIEF DESCRIPTION OF DRAWINGS/FIGURES

FIG. 1*a* is a schematic representation of an embodiment of a system for performing an embodiment of a method as described herein.

Figure 1B:
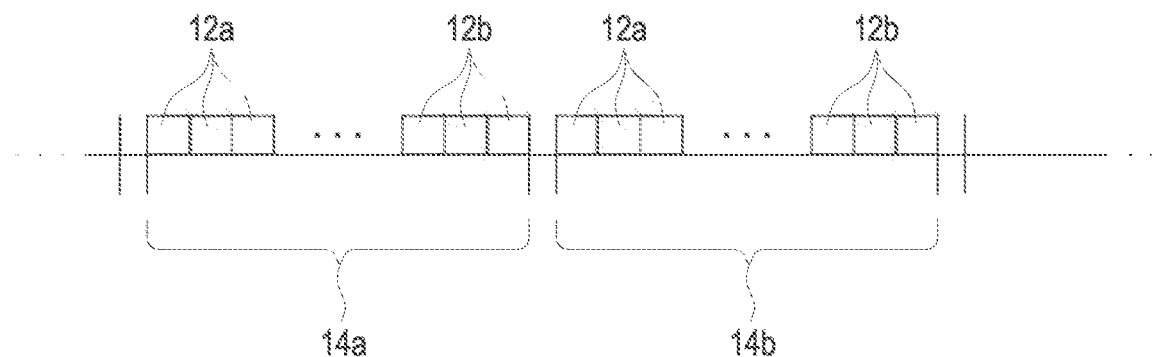

FIG. 1*b* is schematic representation of a time sequence of a data transfer according to some embodiments of the method.

DETAILED DESCRIPTION

For transferring data according to the Bluetooth Low Energy (BLE) standard, the peripheral device and the central device are initially connected. While connecting (pairing), the peripheral device and the central device first negotiate a connection interval with a specific interval length of, for example, 15 ms or 30 ms, and further connection parameters. For each connection interval, a data transfer takes place only within a relatively short transfer window (connection event) which, for example, can take 2 ms. During each transfer window, the central device and the peripheral device always alternately transfer a data packet, wherein the central device starts said transfer. In this way, a maximum transfer bandwidth of approximately 0.3 Mb/s (megabits per second) can be achieved. In practice, the transfer bandwidth during a BLE connection can vary as a result of physical conditions, such as a variable distance between the central device and the peripheral device, an interfering material in the connecting line, interference radiation, and the like. Accordingly, the connection parameters of the BLE connection are dynamically adapted by the devices involved, resulting in a possible fluctuation of the data throughput of a BLE data channel.

However, the Bluetooth Low Energy standard is intended for an event-based data transfer between the peripheral device and the central device. Accordingly, latency periods occurring during a data transfer can be relatively long, so that a transfer of cyclic and/or deterministic data is excluded according to the Bluetooth Low Energy standard. In other words, time-critical data cannot be reliably and promptly transferred, which is why, according to the standard, remote-controlled parking of a vehicle and pulling out of a parking space by means of a mobile terminal is not possible in a safe manner.

Therefore, the problem addressed by the present disclosure is that of providing a method, which avoids the disadvantages described and ensures a reliable transfer of time-critical data on the basis of the BLE standard.

In some embodiments, a method for transferring data, in which a peripheral device and a central device are wirelessly connected in accordance with the Bluetooth Low Energy standard (Bluetooth 4.0/4.1/4.2) and a data packet is transferred within a transfer window of a Bluetooth Low Energy data channel between the peripheral device and the central device. The method is thus used for transferring data in accordance with the BLE standard between the central device, which can be designed as a mobile terminal, for example, a mobile phone, or a stationary terminal, for example, a data processing device or a communication device, and always comprises a standard-compliant BLE module and the peripheral device, which can be designed as a communication device of a vehicle, particularly a motor vehicle and preferably an automobile.

As described above, connection parameters (e.g., a connection interval) are first negotiated during the connecting (pairing) of the devices, on the basis of which a transfer window (connection event) is also determined. During a transfer window, the peripheral device and the central device alternately transfer data packets.

In some embodiments, the transfer of the data packet is controlled by one application installed in both the peripheral device and in the central device such that a high-priority data packet is transferred with a shorter latency period than a low-priority data packet. By way of a non-limiting example, applications installed on the devices involved take on the control of the connection, particularly a prioritizing of the data packets and a priority-dependent transfer of the data packets because the BLE standard does not have such a feature and is accordingly not designed for a time-critical data transfer. The BLE data channel is therefore only used as a transfer medium, while essential control features are provided by the applications, i.e., in an applicative manner. Owing to the priority-based transfer control, a short, predetermined latency period can be maintained for high-priority data packets.

In some embodiments, each application segments data to be transferred into a plurality of data packets as defined by the Bluetooth Low Energy Messages standard before sending and assigns a priority to each data packet, particularly a high priority to a time-critical data packet, and each application assembles the transferred data from the plurality of data packets received. Accordingly, data volumes, which are larger than a transfer unit according to the BLE standard can be transferred without problems. Time-critical data packets, i.e., data packets of cyclic and/or deterministic data are assigned a high priority by the applications. Accordingly, time-critical data packets can be transferred with preference, i.e., low-priority data packets are only transferred when all time-critical data packets have been transferred.

In some embodiments, a high-priority data packet, particularly each high-priority data packet, is transferred before a low-priority data packet. Accordingly, the high-priority data packet does not have to wait, and particularly no high-priority data packet has to wait, for a low-priority data packet to be transferred. While in this case a distinction is only made between high priority and low priority, a person skilled in the art knows that the proposed method is not restricted to two different priorities. Instead, high priority and low priority can be any two different priorities from a multiplicity of different priorities. By way of a non-limiting example, the proposed method readily allows for a differentiated prioritization of data packets to be transferred. Such a differentiated prioritization can be realized, for example, according to an assignment of the data packets to be transferred to a scale value of a scale, wherein, for example, a data packet with high priority can be assigned to a high scale value and a data packet with low priority can be assigned, by comparison, to a relatively low scale value, wherein a further differentiation is achieved through a corresponding number of intermediate scale values.

In some embodiments, the applications manage at least one transfer control parameter and transfer particularly its parameter value by means of separate high-priority transfer control packets via the Bluetooth Low Energy data channel. The transfer of data packets between devices can be further improved by means of the transfer control parameter. If the parameter value of the transfer control parameter changes during a data transfer and the parameter value has to be transferred via the BLE data channel for synchronizing the two applications, the transfer control packets containing the parameter value are assigned a high priority.

In some embodiments, the transfer of the data packets is controlled by means of an applicative packet counter that counts the data packets with a packet number as the parameter value. A packet number is, therefore, assigned to each data packet. The packet number can be used by the applications for identifying a specific sent or received data packet.

In some embodiments, receipt of a high-priority data packet is acknowledged by sending a high-priority confirmation packet comprising the packet number of the received data packet. Such confirmation packets form specific transfer control packets and provide the sender with the assurance that a sent data packet has been received by the receiver. In this way, the packet number serves as an implicit confirmation means within the transfer control. The confirmation packets do reduce the bandwidth of the BLE data channel available for the transfer of data packets. However, the confirmation messages provided in the BLE standard can be omitted. Apart from this, the bandwidth required for transferring a packet number which, for example, comprises only 4 bits, is relatively small.

In some embodiments, a transfer duration of the high-priority data packet is determined on the basis of the received confirmation packet. If the devices involved include a timer, the confirmation packets can be used to determine a transfer duration for each data packet as the time difference between the time the data packet was sent and the time the confirmation packet was received by means of the verified packet number.

A number of high-priority data packets, which can be transferred during the transfer window is calculated on the basis of the determined transfer duration. A comparison of the transfer duration of a data packet with the time span of the transfer window in the form of a division yields the number of data packets that can be transferred per transfer window. If, during a transfer window for high-priority data packets, a shorter or longer transfer duration is measured than before due to a higher data throughput of the BLE data channel, the number of data packets intended for transfer during said transfer window can be dynamically adjusted, i.e., increased or decreased, immediately during the transfer window.

In some embodiments, to determine a generally dynamic data throughput which is the result of the current transfer condition and which can also change on the basis thereof, in that the usually dynamic transfer duration of a data packet is measured and/or an actual number of data packets that are transferred during a current transfer window is calculated. The transfer duration can be measured for each data packet.

In some embodiments, the data rate or the data throughput of the Bluetooth data connection depends on the prevailing transfer conditions, e.g., a distance between the communication partners and/or a currently prevailing environmental condition.

In some embodiments, when it is not possible to transfer all data packets, particularly all highly prioritized data packets or high-priority data packets, during a transfer window, the master, which is usually installed in the central device which can be designed as a mobile terminal, for example, as a mobile phone or a stationary terminal, for example, a data processing device or a communication device, and in each case comprises a standard-compliant BLE module, is provided with a corresponding notice. By way of a non-limiting example, it is possible that a control device for controlling the movement of the vehicle automatically triggers a predetermined or pre-implemented action, which is based, for example, on a data packet that has already been transferred and received if the slave, which is usually installed in the peripheral device located in the vehicle and which can be designed as a communication device of the vehicle, does not receive a data packet necessary for moving the vehicle. By way of a non-limiting example, lowly prioritized data packets or low-priority data packets are overwritten if they cannot or could not be transferred, but they are generally not collected or queued in a waiting loop for later transfer in a future connection interval. If it is not possible to send a highly prioritized data packet during a transfer window, said highly prioritized data packet can be stored at least temporarily. For that purpose, a content or value of a control signal and/or a status signal of such a highly prioritized data packet is taken into account. If such a content or value should become outdated in the meantime, said highly prioritized data packet can be deleted and replaced by a new highly prioritized data packet which has a control signal and/or a status signal with updated content or value. In this case, contents or values of control signals and/or status signals that have already been transferred in data packets can be taken into account.

In some embodiments, by using the described priority-controlled dispatch control, safety-critical (high-priority) cyclic data and unimportant (low-priority) data can be transferred via a "narrow-band" BLE data channel with dynamic data rates with a short latency for highly prioritized data packets and a longer latency for lowly prioritized data packets.

In some embodiments, each application temporarily stores each data packet in an applicative data buffer, so that the application has full access to each temporarily stored data packet. While data packets transferred to the BLE modules are withdrawn from the controlling access of the applications, it is maintained in the applicative data buffer for data packets waiting to be transferred. In a dispatch buffer of the respective BLE modules, only the data to be sent during the next transfer window are stored.

In some embodiments, one of the two applications acts as a master and the other of the two applications acts as a slave, wherein particularly the application installed in the central device acts as a master and the application installed in the peripheral device acts as a slave. A hierarchical interaction of the two applications offers advantages for the connection control because complex negotiations between the two applications are omitted. Accordingly, either of the two applications can assume the leading role as a master. However, the implementation of master functions is simplified if it takes place in the application of the central device.

The application acting as the master determines what number of high-priority data packets are transferred from the peripheral device and from the central device during a respective transfer window, informs the peripheral device with a high-priority transfer control packet of the number determined for the peripheral device, and calculates the transfer duration of high-priority data packets. The transfer duration in the master can be calculated after each receipt of an applicative packet counter by a transfer control packet.

In some embodiments, the master application is the temporal division of each transfer window between the peripheral device and the central device or between slave and master. By way of a non-limiting example, the temporal division is based on the respective transfer requirement for high-priority data packets at a given point in time and the transfer direction. Accordingly, as many data packets are transferred to the respective BLE module as can be transferred within the next transfer window. This makes it easier for the BLE modules to manage their buffer, which can result in a further reduction of the latency periods.

It is self-evident that the features mentioned above and those yet to be described below can be used not only in the particular combination indicated, but also in isolation or in other combinations, without exceeding the scope of the present disclosure.

Using one embodiment of the method, the present disclosure is depicted schematically in the drawings and is further described with reference to the drawings. The drawings show in:

FIG. 1a shows a schematic representation of a system for performing an embodiment of the method according to the present disclosure. The system comprises a vehicle 2 with a peripheral device 8 designed as a control device of the vehicle 2 and a central device 4 designed as a mobile phone, each of which comprises a BLE module and which are connected in accordance with the Bluetooth Low Energy (BLE) standard. The vehicle 2 further comprises an antenna 6 designed as a roof antenna, a functional system 10, which symbolizes one or more comfort systems and/or safety systems, and a bus system 9. The peripheral device 8, the functional system 10, and the antenna 6 are connected to the bus system 9. Alternatively, the antenna 6 in the form of a digital roof antenna (DRA) can also be designed as a peripheral device.

An application 16, 18 for controlling the transfer of data is installed in both the peripheral device 8 and in the central device 4. The application 18 installed in the peripheral device 8 acts as a slave, and the application 16 installed in the central device 4 acts as a master. However, the functions of the applications 16, 18 can also be reversed.

After the coupling is completed, data packets 12 can be exchanged wirelessly between the peripheral device 8 and the central device 4 via a BLE data channel, which is indicated in FIG. 1a by double arrows.

In a schematic representation, FIG. 1b shows a time sequence of a data transfer according to one embodiment of the method according to the invention. In the drawing, the time axis runs horizontally from left to right, i.e., a first point in time on the left is earlier than a second point in time.

When connecting (pairing), the peripheral device 8 and the central device 4 have negotiated connection parameters according to the BLE standard, such as the duration of a transfer interval (connection interval), which define a BLE data channel, and thus a transfer window 14a, 14b (connection event) is determined.

However, the transfer intervals and the transfer windows 14a, 14b in FIG. 1b are not shown true to scale. In practice, the transfer intervals, i.e., essentially the transfer-free gaps between the transfer windows present within the transfer intervals, are significantly wider than the transfer windows 14a, 14b.

Before sending data, each application 16, 18 segments the data to be transferred into a plurality of data packets 12, 12a, 12b (Bluetooth Low Energy Messages) and assigns a priority to each data packet 12, 12a, 12b. In this case, a time-critical data packet 12, 12a is given a high priority. After segmentation, each application 16, 18 temporarily stores each data packet 12, 12a, 12b in an applicative data buffer so that the application 16, 18 has full access to each temporarily stored data packet 12, 12a, 12b at all times. This means great flexibility in the selection and transfer of temporarily stored data packets 12, 12a, 12b to the respective BLE module. The respective other application 18, 16 reassembles the transferred data from the plurality of received data packets 12, 12a, 12b.

The transfer of data packets 12, 12a, 12b is controlled by the applications 16, 18 such that a high-priority data packet 12, 12a is transferred with a shorter latency period than a low-priority data packet 12, 12b. For this purpose, high-priority data packets 12, 12a are transferred before low-priority data packets 12, 12b, i.e., the former are transferred earlier than the latter, within each transfer window 14a, 14b.

This is achieved purely applicatively, in that the applications 16, 18 manage at least one transfer control parameter and its parameter value is also transferred via the Bluetooth Low Energy data channel by means of separate high-priority transfer control packets (not depicted).

In the depicted embodiment of the method, the transfer of the data packets 12, 12a, 12b is controlled as a parameter value by means of an applicative packet counter that counts the data packets 12, 12a, 12b with a packet number (n_ms) 20, which is part of the data packets 12, 12a, 12b, and a receipt of a high-priority data packet 12, 12a is acknowledged by the return of a high-priority confirmation packet (not depicted) comprising the packet number 20 of the received data packet 12, 12a, 12b. The application 16 acting as a master determines a transfer duration (t_msm) of the high-priority data packet 12, 12a on the basis of the received confirmation packet.

Furthermore, the application 16 acting as a master calculates a number of high-priority data packets 12, 12a that can be transferred during the transfer window on the basis of the determined transfer duration. In addition, the application 16 acting as master determines which number of high-priority data packets 12, 12a can be transferred during a next transfer window from the central device 4 and from the peripheral device 8, and informs the peripheral device 8 with a high-priority transfer control packet (not depicted) of the number relevant for the peripheral device 8.

In accordance with some embodiments, an application of the method, as described herein, is a remote-controlled parking and pulling out of a vehicle by means of a mobile terminal (piloted parking). Time-critical data, such as those for controlling a movement or the engine run of the vehicle, as well as safety-critical data, such as information relating to an obstacle, are transferred bidirectionally with high priority between the smartphone and the vehicle, while information with lesser relevance, such as video data from a camera or display information for graphically displaying a trajectory with low priority, is transferred in parallel via the same Low Energy Bluetooth data channel.

Accordingly, the widespread BLE standard can be used to transfer time-critical data between two devices with a time-variable data bandwidth, and widespread BLE-capable mobile terminals can be used for remotely controlling vehicles.

LIST OF REFERENCE SIGNS

2 Vehicle
4 Central device
6 Antenna
8 Peripheral device
9 Bus system
10 Functional system
12, 12a, 12b Data packet
14a, 14b Transfer window
16 Application, acting as a master
18 Application, acting as a slave

The invention claimed is:

1. A method for transferring data, the method comprising:
controlling transfer of at least one data packet between a peripheral device and a central device wirelessly connected with each other using a Bluetooth Low Energy (BLE) standard;
transferring the at least one data packet within a transfer window of a BLE data channel between the peripheral device and the central device,
wherein the transfer of the at least one data packet is managed by a first application installed in the peripheral device and by a second application installed in the central device in a hierarchic interaction such that a high-priority data packet is transferred with a shorter latency period than a low-priority data packet, and
wherein the first and second applications are in a master-slave relation; and
determining a count of high-priority data packets to be transferred during the transfer window based on a difference between a time a data packet is sent and a time a confirmation packet is received.

2. The method of claim 1, further comprising:
segmenting, by the first application, the transferred data into a plurality of data packets before transferring;
assigning a priority to each data packet of the plurality of data packets, wherein a higher value of the priority is assigned to a time-critical data packet; and
causing to assemble, by the second application, the transferred data from the plurality of received segmented data packets by the first application.

3. The method of claim 1, further comprising:
transferring the at least one data packet assigned a higher value of priority before another data packet assigned a lower value of priority;
transferring the high-priority data packet with a shorter latency period than the low-priority data packet through a control of one application installed on both the central device and peripheral device; and dynamically adjusting a number of high-priority data packets intended for transfer during the transfer window based on a measurement of a transfer duration of a data packet.

4. The method of claim 1, further comprising:
managing the transfer of the at least one data packet using at least one transfer control parameter; and
transferring a value corresponding to the at least one transfer control parameter via the BLE data channel using one or more high-priority transfer control packets.

5. The method of claim 4, wherein the managing the transfer of the at least one data packet comprises:
controlling an applicative packet counter that counts data packets with a packet number as a parameter value; and
acknowledging receipt of a data packet assigned a higher value of priority by sending a confirmation packet comprising the packet number of the received data packet, wherein the confirmation packet is assigned the higher value of priority.

6. The method of claim 5, further comprising determining a transfer duration of the data packet assigned the higher value of priority based on the confirmation packet.

7. The method of claim 6, further comprising calculating a number of data packets assigned the higher value of priority based on the determined transfer duration.

8. The method of claim 1, further comprising storing each data packet temporarily in an applicative data buffer for full access to each temporarily stored data packet.

9. The method of claim 1, the first and second applications in the master-slave relation being the second application installed in the central device as a master application and the first application installed in the peripheral device as a slave application.

10. The method of claim 1, further comprising:
calculating, by a master application of the first and second applications in the master-slave relation, transfer duration of the high-priority data packet;
determining, by the master application, a count of high-priority data packets being transferred between the peripheral device and the central device during the transfer window; and
transmitting, to the peripheral device, a high-priority transfer control packet comprising the count of the high-priority data packets for the peripheral device.

11. The method of claim 1, further comprising:
prioritizing a plurality of data packets to be transferred through assignment of a scale value on a scale with multiple priorities, wherein the scale between a scale value corresponding to a high-priority and a scale value corresponding to a low scale value is further differentiated through a plurality of intermediate scale values.

12. A motor vehicle, comprising:
a peripheral device comprising a first application, wherein the peripheral device acts as a control device, wherein the peripheral device is configured to be wirelessly connected with a central device using a Bluetooth Low Energy (BLE) standard, the central device being external to the motor vehicle, and wherein the central device comprises a second application,
wherein the first application is configured to perform operations comprising:
controlling transfer of at least one data packet between the peripheral device and the central device using the BLE standard;
transferring the at least one data packet within a transfer window of a BLE data channel between the peripheral device and the central device,
wherein the transfer of the at least one data packet is managed by the first application installed in the peripheral device and by the second application installed in the central device in a hierarchic interaction such that a high-priority data packet is transferred with a shorter latency period than a low-priority data packet, and
wherein the first and second applications are in a master-slave relation;
determining a count of high-priority data packets to be transferred during the transfer window based on a difference between a time a data packet was sent and a time a confirmation packet is received.

13. The motor vehicle of claim 12, wherein the first application is further configured to:
segment the transferred data into a plurality of data packets before transferring;
assign a priority to each data packet of the plurality of data packets, wherein a higher value of the priority is assigned to a time-critical data packet; and
cause to assemble, by the second application, the segmented transferred data from the plurality of data packets.

14. The motor vehicle of claim 12, wherein the first application is further configured to:
transfer the at least one data packet assigned a higher value of priority before another data packet assigned a lower value of priority;
transfer the high-priority data packet with a shorter latency period than the low-priority data packet through a control of one application installed on both the central device and peripheral device; and
dynamically adjust a number of high-priority data packets intended for transfer during the transfer window based on a measurement of a transfer duration of a data packet.

15. The motor vehicle of claim 12, wherein the first application is further configured to:
manage the transfer of the at least one data packet using at least one transfer control parameter; and
transfer a value corresponding to the at least one transfer control parameter via the BLE data channel using one or more high-priority transfer control packets.

16. The motor vehicle of claim 15, wherein the first application is further configured to manage the transfer of the at least one data packet by:
controlling an applicative packet counter that counts data packets with a packet number as a parameter value; and
acknowledging receipt of a data packet assigned a higher value of priority by sending a confirmation packet comprising the packet number of the received data packet, wherein the confirmation packet is assigned the higher value of priority.

17. The motor vehicle of claim 16, wherein the first application is further configured to determine a transfer duration of the data packet assigned the higher value of priority based on the confirmation packet.

18. The motor vehicle of claim 17, wherein the first application is further configured to calculate a number of data packets assigned the higher value of priority based on the determined transfer duration.

19. The motor vehicle of claim 12, wherein the first application is further configured to store each data packet temporarily in an applicative data buffer for full access to each temporarily stored data packet.

20. The motor vehicle of claim 12, wherein the first application is further configured to:
- calculate, as a master application in the master-slave relation, transfer duration of the high-priority data packet;
- determine, by the master application, a count of high-priority data packets being transferred between the peripheral device and the central device during the transfer window; and
- transmit, to the peripheral device, a high-priority transfer control packet comprising the count of the high-priority data packets for the peripheral device.

* * * * *